(12) United States Patent
Borrell

(10) Patent No.: US 12,419,337 B2
(45) Date of Patent: Sep. 23, 2025

(54) CRACKING-SHELLING MECHANISM WITH VARIABLE EXCENTRIC ADJUSTMENT FOR SHELLED FRUITS

(71) Applicant: Roig Borrell S.L., Denia (ES)

(72) Inventor: Jose Vicente Roig Borrell, Denia (ES)

(73) Assignee: Roig Borrell S.L., Denia (ES)

( * ) Notice: Subject to any disclaimer, the term of this patent is extended or adjusted under 35 U.S.C. 154(b) by 691 days.

(21) Appl. No.: 17/870,397

(22) Filed: Jul. 21, 2022

(65) Prior Publication Data
US 2023/0029247 A1    Jan. 26, 2023

(30) Foreign Application Priority Data
Jul. 21, 2021   (ES) .................................. 202130706

(51) Int. Cl.
*A23N 5/00* (2006.01)
*A23N 5/08* (2006.01)

(52) U.S. Cl.
CPC .............. *A23N 5/00* (2013.01); *A23N 5/008* (2013.01); *A23N 5/08* (2013.01)

(58) Field of Classification Search
CPC ............. A23N 5/00; A23N 5/008; A23N 5/08
See application file for complete search history.

(56) References Cited

FOREIGN PATENT DOCUMENTS

| EP | 3318780 A1 | * | 5/2018 |
|---|---|---|---|
| ES | 2016175 A6 | | 10/1990 |
| ES | 1189409 U | | 8/2017 |
| IT | 201800003579 U1 | * | 4/2020 |

* cited by examiner

*Primary Examiner* — Ibrahime A Abraham
(74) *Attorney, Agent, or Firm* — Farber LLC

(57) ABSTRACT

The present invention refers to a cracking-shelling mechanism with variable eccentric adjustment for shelled fruits, that comprises a plurality of longitudinal blocks parallel among them, consisting of a couple of first elongated bars with recesses on its internal sides and, adjacent to said first elongated bars, at least one second elongated bar, which exhibits recesses on its internal sides, forming holes when the first and second elongated bars are confrontedly arranged. Each couple of first elongated bars is connected by means of a lever, in its turn connected to a connecting rod, to an eccentric rotation shaft. The lever is connected to a fastening means at a support point and the support means comprises displacement means that change its position with respect of the fastening means, in such a way that the first elongated bars run is adjusted, jointly, with respect of the second elongated bar.

8 Claims, 4 Drawing Sheets

CRACKING-SHELLING MECHANISM WITH VARIABLE EXCENTRIC ADJUSTMENT FOR SHELLED FRUITS

FIELD OF THE INVENTION

The present invention belongs to the technical field of cracking and shelling machines for shelled fruits (fruits with shell), in particular, to a cracking-shelling mechanism with variable eccentric adjustment for said machines, which exhibits a plurality of blocks wherein each bock is formed by a couple of first mobile elongated bars and at least a second elongated bar, in such a way that between said first elongated bars and the second elongated bar some cracking and shelling holes for shelled fruits are formed.

BACKGROUND OF THE INVENTION

In the state of the art there are described a series of cracking-shelling mechanisms, for cracking-shelling machines of shelled fruits, such as almonds and the like.

In document ES2016175, also from the present applicant, it is described a machine for cracking and shelling shelled fruits that uses a cracking-shelling mechanism formed by a series of first elongated bars that present an alternate movement in both senses along their longitudinal axis and a series of second fixed elongated bars and arranged parallel and alternated to the former first bars.

At the sides of these elongated bars there are recesses with semi-circular shape that are arranged in a way that they coincide at the confronted sides of each adjacent first and second longitudinal bars, in such a way that they conform circular holes whose cross-section is reduced and increased alternatively, upon the alternate movement of the first longitudinal bars. In this way, when the first elongated bars move in a first sense, the cross-section is reduced and causes the cracking and shelling of the fruit, whereas when these first elongated bars move in the opposite sense, they allow the fruit to fall and the entry of a new fruit, which will be cracked and shelled with the forthcoming movement of the first elongated bars, movable with respect of the second elongated bars, alternately arranged with the first elongated bars.

The cracking-shelling mechanism described in ES2016175 exhibits a connecting rod coupled to an eccentrically rotating shaft to transmit a longitudinal force from a rotating movement.

In certain machines from the state of the art, the elongated bars run can be adjusted by modifying the eccentricity of the connecting rod by acting upon a fixing screw arranged thereon. But in practice, this is not simple nor convenient, because it implies that the machine must be stopped every time the first elongated bars run needs to be changed, with the ensuing productivity and time loss.

ES1189409U describes a shelling machine with variable run in which the mobile elongated bars run is adjusted while the machine is working. The machine comprises an eccentric element coupled to a connecting rod. The eccentric element coupled to the connecting rod is associated to the rotation with blocking means of the rotating shaft by controlled adherence. The eccentric element connected to the connecting rod comprises a slotted hole through which there is a motor-actioned rotating shaft. The regulating means of the elongated bars run comprise a motorised lever that presses the eccentric element coupled to the connecting rod, so as to move it along the slotted hole, by means of a transmissionless wheel. The force transmitted by the transmissionless wheel is greater than the axial force applied by the controlled adherence blocking means. The transmissionless wheel arranged in a point of the motorised lever transmits the position changes of the eccentric element with respect of the rotating shaft. The motorised lever comprises an articulated end in a fixed point of the machine, whereas the free end is connected to an actuator by means of a bolt. The change in the position of the eccentric element respect to the rotating shaft modifies the eccentricity parameters of the machine. In the machine described in ES1189409U, the adjustment is carried out actuating a pressing button arranged in a control panel of the machine, in such a way that, when pressed, the actuator pushes the wheel to displace the eccentric element along the slotted hole.

The practical application of the cracking-shelling mechanism of ES1189409U is extraordinarily complex from a mechanical point of view, given the rotation speed of the shaft and the torques generated by the eccentric movement and the impacts transmitted by the blocks or elongated bars. The complexity of the system, the size of the parts involved and the foreseeable wear on the parts make its implementation unfeasible in shelling machines. For a practical application, it would be required non-described additional lubricating means of the system which are in conflict with the application of a cracking-shelling mechanism in a food processing application. Furthermore, the cracking-shelling mechanism of ES1189409U requires blocking means of the rotating shaft by controlled adherence. It would be advantageous to develop a cracking-shelling mechanism that omits said blocking means of the rotating shaft, thus reducing the complexity of the cracking-shelling mechanism of ES1189409U.

On another hand, the cracking-shelling mechanism of ES1189409U does not allow to change the first and second elongated bars run at the same time that the force generated in the other side respect to the point of application of said force is changed. It would be advantageous to develop a cracking-shelling mechanism that allows variation of the elongated bars run at the same time that changes are made in the force generated in the other side respect to the point of application of said force. In this way, the cracking-shelling machine would be conferred with more versatility because it could be used with fruits of different sizes and shapes. This would also allow its adaptable use for fruits of species whose shell exhibit a greater or lesser hardness.

From this it can be concluded that, despite the developments of the state of the art, it still exists a need to modify the cracking and shelling mechanisms of shelled fruits existing in the state of the art in order to enhance the efficacy of the variable eccentric adjustment of the connecting rods of said mechanisms and of the elongated bars run coupled to said connecting rods.

SUMMARY OF THE INVENTION

The technical problem to be solved consists of providing a cracking-shelling mechanism with variable eccentric adjustment for shelled fruits, for cracking-shelling machines of shelled fruits, that does not require rotating shaft blocking means and that allows changing the elongated bars run, at the same time changes in the force generated in the other side respect to the point of application of said force take place.

The invention according to claim 1 provides a solution to said technical problem.

The dependent claims describe preferred embodiments of the invention.

The cracking-shelling mechanism of the invention does not require the use of blocking means for the rotating shaft, thus simplifying the cracking-shelling mechanism described in the state of the art.

Furthermore, the cracking-shelling mechanism of the invention allows changing the elongated bars run at the same time that changes in the force generated in the other since respect to the point of application of said force take place. In this way, the cracking-shelling machine is conferred with more versatility because it can be used with fruits of different sizes and shapes. This also allows its adaptable use for fruits of species whose shell exhibit a greater or lesser hardness.

The cracking-shelling mechanism of the invention comprises a plurality of elongated blocks parallel to each other.

Each block consists of, in turn, a couple of first mobile elongated bars, which exhibit recesses consecutively arranged on the internal sides of said first elongated bars and, adjacent to said first elongated bars, at least one second elongated bar, which exhibits recesses consecutively arranged on the internal sides of said second elongated bar, in such a way that, when arranged confronted to the first elongated bars, a plurality of passing vertical holes are formed.

In the cracking-shelling mechanism of the invention, each couple of first elongated bars of each block is connected by a first end, by means of a rod in its turn connected to a first connecting rod, to an eccentric rotation shaft, in such a way that, each couple of first elongated bars of each block presents an alternate movement and together of both first elongated bars in both senses along the longitudinal axis thereof.

In the cracking-shelling mechanism of the invention, the rod is connected to a fastening means at a support point, wherein said fastening means comprises displacement means that move the position of said support point with respect of said fastening means, in such a way that the first elongated bars run is adjusted with respect of the second elongated bar or couple of elongated bars, of each block.

The cracking-shelling mechanism with variable eccentric adjustment of the invention is based on the lever principle. The lever principle was explained by Arquimedes in Syracuse, being considered one of the main scientists of ancient times. The lever is a simple machine the function of which is to transmit force and movement. It consists of a rigid rod that can pivot about a support point. It can be used to amplify the force applied to an object, to increase its peed or displacement distance, is response to the application of a force.

As a consequence of the lever principle previously mentioned, when displacing the support point of the cracking-shelling mechanism of the invention, a change in the first elongated bars run is produced with respect of the second elongated bar or couple of elongated bars, at the same time that changes in the force generated in the other side respect to the point of application of said force take place.

The adjustment of the first elongated bars run with respect to the second elongated bar o couple of bars is carried out to adapt the working behaviour of the cracking-shelling machine for shelled fruits, to the type of fruit, humidity degree, fruit shape, shell hardness, etc.

In a preferred embodiment of the cracking-shelling mechanism of the invention, said second elongated bar is fixed.

In an alternative embodiment, the cracking-shelling mechanism of the invention comprises a couple of mobile second elongated bars connected to a seesaw. Said seesaw comprises a fixed central rotation shaft and a second connecting rod connected in its turn at a first end to the central shaft and at its second end to the second end of the second elongated bars and a third connecting rod also connected in its turn, at a first end to the central shaft, in opposite fashion to the second connecting rod and, at a second end to the second end of the first elongated bars, in such a way that the second elongated bars exhibit an alternative movement in both senses along the longitudinal axis thereof and in the opposite sense to the first elongated bars.

In this way, a mechanism is obtained wherein the displacement of the first elongated bars as well the displacement of the second elongated bars takes place, thus increasing the aperture and closure run of the holes, which facilitates that, in the case of clogging of any fruit inside the hole, the same relative movement of the elongated bars between each other acts to cause unclogging thereof.

In a preferred embodiment of the cracking-shelling mechanism of the invention, said fastening means is vertically displaced along a guiding element.

The guiding element may be any guiding element known by the skilled person to displace the support point, such as spindles, bolts, bearings. Therefore, in a more preferred embodiment of the cracking-shelling mechanism of the invention, said guiding element is selected from the group of spindles, bolts and bearings.

In a preferred embodiment of the cracking-shelling mechanism of the invention, said displacement means is a manual wheel.

In another preferred embodiment of the cracking-shelling mechanism of the invention, the displacement means move automatically.

In another additional preferred embodiment of the cracking-shelling mechanism of the invention, said displacement means is an actuator.

In a more preferred embodiment of the cracking and shelling mechanism of the invention, said actuator is an electric motor.

BRIEF DESCRIPTION OF THE DRAWINGS

In order to aid in a better understanding of the features of the invention, according to a preferred example of a practical embodiment thereof, there is provided, as integral part of said description, a series of drawings wherein, with illustrative and non-limiting character, the following has been represented.

DETAILED DESCRIPTION OF THE INVENTION

The drawings show preferred embodiments of the invention.

Figure 1A:
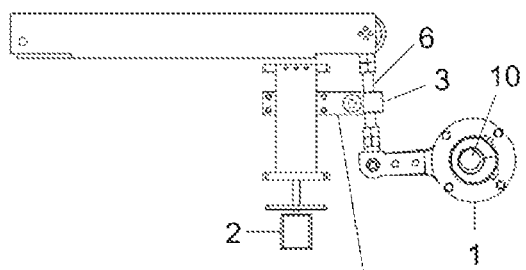
FIG. 1A shows a side view of a block of a cracking-shelling mechanism for shelled fruits, according to a preferred embodiment of the invention, with a fixed elongated bar.
Figure 1B:
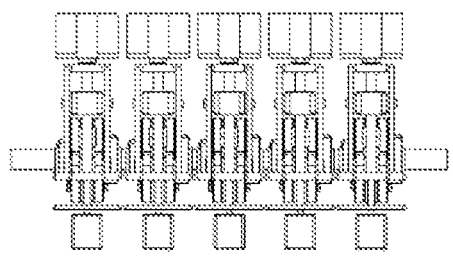
FIG. 1B shows a rear view of several blocks of a cracking-shelling mechanism for shelled fruits, according to a preferred embodiment of the invention, with fixed second elongated bars.
Figure 1C:
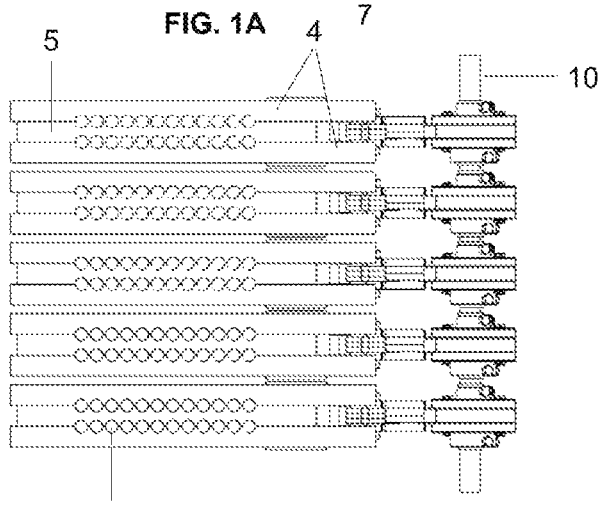
FIG. 1C shows a top view of several blocks of a cracking-shelling mechanism for shelled fruits, according to a preferred embodiment of the invention, with fixed second elongated bars.

In FIG. 1C, it can be observed that the cracking-shelling mechanism of the invention comprises a plurality of first elongated bars 4 parallel among them and a plurality of second elongated bars 5 parallel to the first elongated bars and alternately arranged and adjacent thereof, forming blocks.

In FIG. 1C, it can be seen that the first and second elongated bars 4, 5 exhibit sides with semi-circular adjacent recesses and between the sides of each first and second elongated bars 4, 5, a plurality of vertical passing holes 8 is formed.

Figure 2:
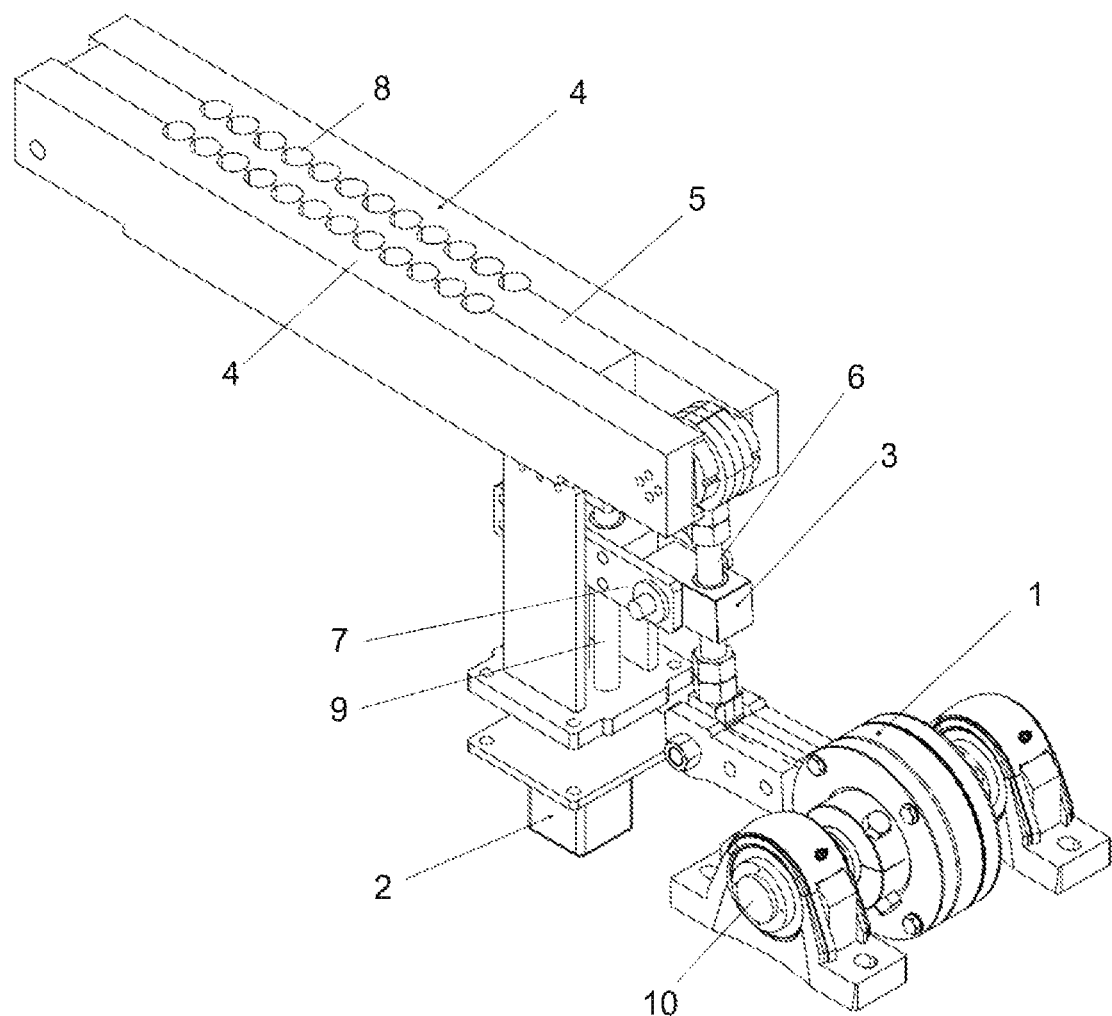
FIG. 2 shows a perspective view of single block of a cracking-shelling mechanism for shelled fruits, according to a preferred embodiment of the invention, with a fixed second elongated bar.

In FIG. 1A and in FIG. 2, it is observed that each couple of first mobile bars 4 are connected at a first end, by means of a lever 6 in its turn coupled to a first connecting rod 1, to an eccentric rotation shaft 10. Each couple of first elongated bars 4 exhibits al alternate movement in both senses along the longitudinal axis of said first elongated bars 4.

In FIG. 1A and in FIG. 2, it is observed that the lever 6 is connected to a fastening means 7 at a support point 3. The fastening means 7 comprises of displacement means that move the position of the support point 3 in relation with the fastening means 7 and an actuator 2 which moves the position of the support point 3. The movement of the position of the support point 3 with respect of the fastening means 7 jointly adjusts the run of the first mobile elongated bars 4 with respect of the second fixed elongated bars 5.

In FIG. 2, it can be seen a guiding spindle 9, in such a way that the fastening means 7 is vertically displaced along the guiding spindle 9.

Figure 3:
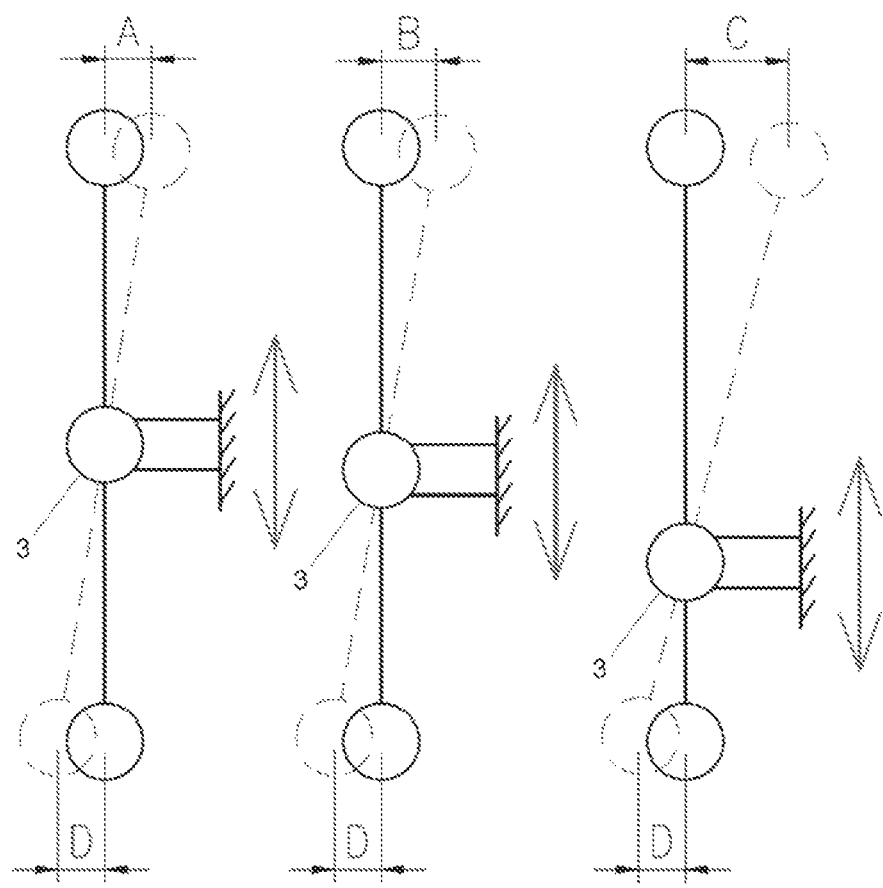
FIG. 3 schematically shows three different positions of the support point of a block of a cracking-shelling mechanism for shelled fruits, according to a preferred embodiment of the invention.

In FIG. 3 three different positions of the displaceable support point 3 are shown. The distance D is the same in all three and due to the three positions of the support point 3 shown in FIG. 3, according to the lever principle, distances C, B and A keep the following order: C>B>A.

Figure 4:
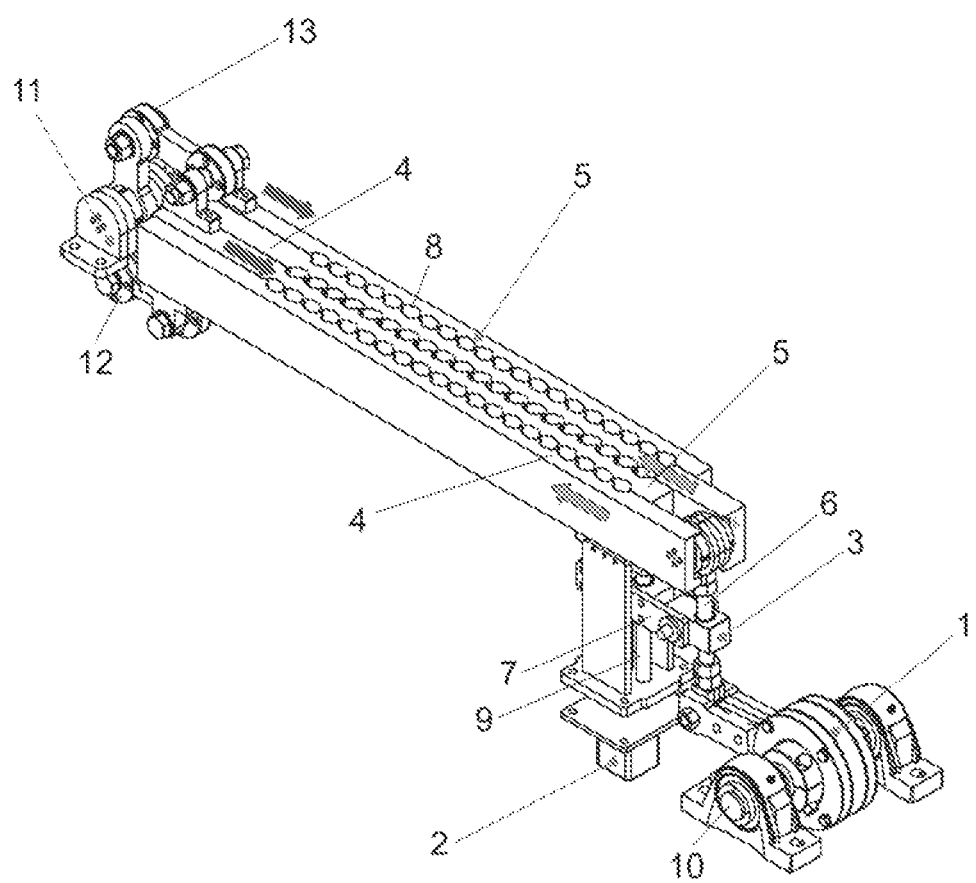
FIG. 4 shows a perspective view of a single block of a cracking-shelling mechanism for shelled fruits, according to a preferred embodiment of the invention, with mobile second elongated bars.

In FIG. 4 it is observed a couple of second mobile elongated bars 5, connected to a seesaw 11 that comprises a central rotation shaft and a fixed connecting rod 12, in turn connected at a first end to the central shaft and at a second end to the second end of the second elongated bars 5 and a third connecting rod 13 connected also in turn at a first end to the central shaft, in opposite fashion to the second connecting rod 12, and at a second end to the second end of the first elongated bars 4, in such a way that the second elongated bars 5 exhibit an alternate displacement in both senses along the longitudinal axis thereof and in opposite sense to the displacement of the first elongated bars 4. The arrows show the movement sense of the first and second elongated bars 4, 5 in a given moment of the operation of the cracking-shelling mechanism of the invention.

REFERENCE NUMERALS LIST 1 first connecting rod
2 actuator
3 support point
4 first elongated bars
5 second elongated bars
6 lever
7 fastening means
8 passing vertical holes
9 guiding spindle
10 eccentric rotating shaft
11 seesaw
12 second connecting rod
13 third connecting rod

What is claimed is:

1. A cracking-shelling mechanism with variable eccentric adjustment for shelled fruits comprising a plurality of longitudinal blocks parallel among them, wherein each block comprises a couple of first mobile elongated bars, which exhibit recesses consecutively arranged on the internal sides of said first mobile elongated bars and, adjacent to said first mobile elongated bars, at least a second elongated bar, which exhibits recesses consecutively arranged on the internal sides of said second elongated bar, in such a way that when confronting said first mobile elongated bars, a plurality of vertical passing holes is formed, wherein each couple of first mobile elongated bars is connected at a first end, by a lever, in its turn connected to a first connecting rod, to an eccentric rotation shaft, in such a way that each couple of first mobile elongated bars exhibits a joint alternate movement in both senses along the longitudinal axis on said first mobile elongated bars; and in that said lever is connected to a fastener at a support point, wherein said fastener comprises a displacement element that moves a position of said support point with respect to said fastener, in such a way that the first mobile elongated bars run is jointly adjusted with respect of the second elongated bar, comprising a couple of second mobile elongated bars connected to a seesaw, wherein said seesaw comprises a central rotation shaft and a second connecting rod in its turn connected at a first end to the central shaft and at a second end to the second end of the second mobile elongated bars and a third connecting rod also in its turn connected at a first end to the central shaft and in an opposite fashion to the second connecting rod and at a second end to the second end of the first mobile elongated bars, in such a way that the second mobile elongated bars exhibit an alternate movement in both senses along the longitudinal axis thereof and in opposite sense to the movement of the first mobile elongated bars.

2. The cracking-shelling mechanism according to claim 1 wherein said second elongated bar is fixed.

3. The cracking-shelling mechanism according to claim 1 wherein the fastener is vertically displaced along a guiding element.

4. The cracking-shelling mechanism according to claim 3 wherein said guiding element is selected form the group consisting of spindles, bolts and bearings.

5. The cracking-shelling mechanism according to claim 1 wherein said displacement element is a manual wheel.

6. The cracking-shelling mechanism according to claim 1 wherein said displacement element moves automatically.

7. The cracking-shelling mechanism according to claim 1 wherein said displacement element is an actuator.

8. The cracking-shelling mechanism according to claim 7 wherein said actuator is an electric motor.

* * * * *